United States Patent [19]

Sabatier et al.

[11] Patent Number: 5,011,196
[45] Date of Patent: Apr. 30, 1991

[54] UNION FOR FLUID CONDUITS, IN PARTICULAR FOR HIGH PURITY GAS

[76] Inventors: André Sabatier, 83, avenue du Président Kennedy, 94190 Villeneuve Saint-Georges; Raymond Depraetere, 1, rue des Coquelicots, 91000 Evry, both of France

[21] Appl. No.: 506,110

[22] Filed: Apr. 9, 1990

[30] Foreign Application Priority Data

Apr. 12, 1989 [FR] France .................. 89 04836

[51] Int. Cl.⁵ .............................. F16L 19/02
[52] U.S. Cl. ..................... 285/367; 285/16; 285/347; 285/379; 277/181; 277/225
[58] Field of Search ............ 285/24, 27, 65, 70, 285/99, 276, 336, 337, 352, 353, 365, 367, 910, 918; 277/81 R, 81 S, 101, 168, 192, 198

[56] References Cited

U.S. PATENT DOCUMENTS 3,775,832 12/1973 Werra .
4,218,080 8/1980 Kendrick .................. 285/367 X
4,496,176 1/1985 Weinhold .................. 285/365

FOREIGN PATENT DOCUMENTS 2209117 2/1972 Fed. Rep. of Germany .
2405827 2/1974 Fed. Rep. of Germany .
2819921 5/1978 Fed. Rep. of Germany .
1258305 12/1971 United Kingdom .

Primary Examiner—Dave W. Arola
Assistant Examiner—Tim Aberle
Attorney, Agent, or Firm—Dennison, Meserole, Pollack & Scheiner

[57] ABSTRACT

Each end fitting of the union has an end for fixing the fluid line, and a coaxial metallic body terminating in an annular radial polished section where the internal bore of the union issues. A washer made of a deformable synthetic material is pressed on this metallic body and has a flat annular radial face which, together with the polished section, forms the free face for connecting the end fitting. A cylindrical metallic ring accommodates internally with a contact fit the two washers and a portion of the two metallic bodies, so that the two free connecting faces come to be opposite each other. Two clamping half-shells grip the two end fittings to ensure the connection of the fluid lines.

16 Claims, 3 Drawing Sheets

UNION FOR FLUID CONDUITS, IN PARTICULAR FOR HIGH PURITY GAS

FIELD OF THE INVENTION

The invention concerns the connection of fluid conduits.

It applies advantageously, but not exclusively, to the manufacture of microelectronic components requiring the use of very high purity gas, in particular during the diffusion stages.

For such an application, it is necessary to ensure a very good seal at the connections between the conduits carrying the high purity gas in order, on the one hand, to prevent leakages and, on the other hand, to prevent ingress into the conduits of external agents capable of producing for example the oxidation of the conduits or of components incorporating those conduits by interaction with the gas carried. Such an oxidation would in the long run impair the production quality of the components.

It is also necessary to avoid as far as possible the micro-erosion of matter which may possibly occur during the mechanical operation of connecting the fluid conduits.

It is also desirable to minimise the mass of such unions when the latter are used in certain fields, in particular in aerospace applications where weight is the determining factor.

OBJECTS OF THE INVENTION

The problem posed by the presently known unions lies in the fact that they only partly take into consideration the set of constraints set out above. Moreover, this consideration even though partial, generally requires a sophistication of the product, which complicates its assembly, increases its weight, and may have an adverse effect on the production costs.

The object of the invention is to provide a solution for this problem.

One aim of the invention is to provide a union for a fluid line ensuring a very good seal in the region of the connection.

Another aim of the invention is to propose a union not using a so-called sealing gasket, thereby facilitating assembly.

To facilitate still further, in particular, the assembly and to reduce the production costs, the invention aims to provide a union comprising neither male elements, nor female ones.

Another aim of the invention is to propose a union whose mechanical assembly operation does not lead to any micro-erosion of matter.

Moreover, it is an object of the invention to provide a union of small mass and one that is inexpensive to produce.

It is a further object of the invention to provide a union for fluid lines of the type comprising two end fittings, each having an end intended to be fixed on to at least one respective fluid line, and a free connecting face, as well as means for the mutual tightening of these two opposed end fittings via their free faces.

SUMMARY OF THE INVENTION

According to the invention, each end fitting comprises a coaxial metallic body having an internal bore whose diameter is continuous with that of the fluid conduit and presenting externally, starting from the fixing end, a conical bearing surface flaring towards a cylindrical bearing surface; the cylindrical bearing surface is followed by at least one flat shoulder recessed towards a central cylindrical portion terminating in an annular radial polished section where the internal bore issues. Each end fitting also comprises a washer of external cylindrical shape made of a deformable synthetic material capable of being fitted on and in contact with the central cylindrical portion, so as to abut against the flat shoulder; this cylindrical washer has a radial annular face which, together with the polished section of the central cylindrical portion, forms the free connecting face of the end fitting; provision is also made for a metallic elongate cylindrical ring capable of internally accommodating, with a contact fit, the two washers and a part at least of each of the two cylindrical bearing surfaces of the end fittings placed face to face, so that the two free connecting faces come to be opposite each other; the mutual tightening means then comprise two half-shells having two conical bearing surfaces similar to the two respective conical bearing surfaces of the two metallic bodies, the tightening of these two half-shells ensuring the connection of the fluid conduits.

The geometrical characteristics of the end fittings are chosen very advantageously to allow, during the tightening of the two half-shells, first a compression of the two washers made of a deformable synthetic material, then the contact between the two annular polished sections.

In one embodiment, to obtain this compression, the plane of the annular radial polished section of each end fitting is, before connection, situated so as to be slightly recessed in relation to the plane of the radial face of the corresponding washer.

To prevent, in particular, the erosion of matter during the mechanical assembly operation, the synthetic material of each washer advantageously has a low coefficient of friction in relation to the material of the elongate ring.

In a variant of the invention, the cylindrical bearing surface of each end fitting is followed by at least two successive flat shoulders recessed towards the said central cylindrical portion.

BRIEF DESCRIPTION OF THE DRAWINGS

Other objects and advantages of the present invention will become apparent on examining the following detailed description given with reference to the accompanying drawings, wherein.

DESCRIPTION OF THE PREFERRED EMBODIMENT

In essence, the drawings comprise geometrical elements of a definite nature. On this basis, they form an integral part of the description and serve, not only to provide a better understanding of the detailed description given below, but can also contribute to the definition of the invention if required.

Figure 1:
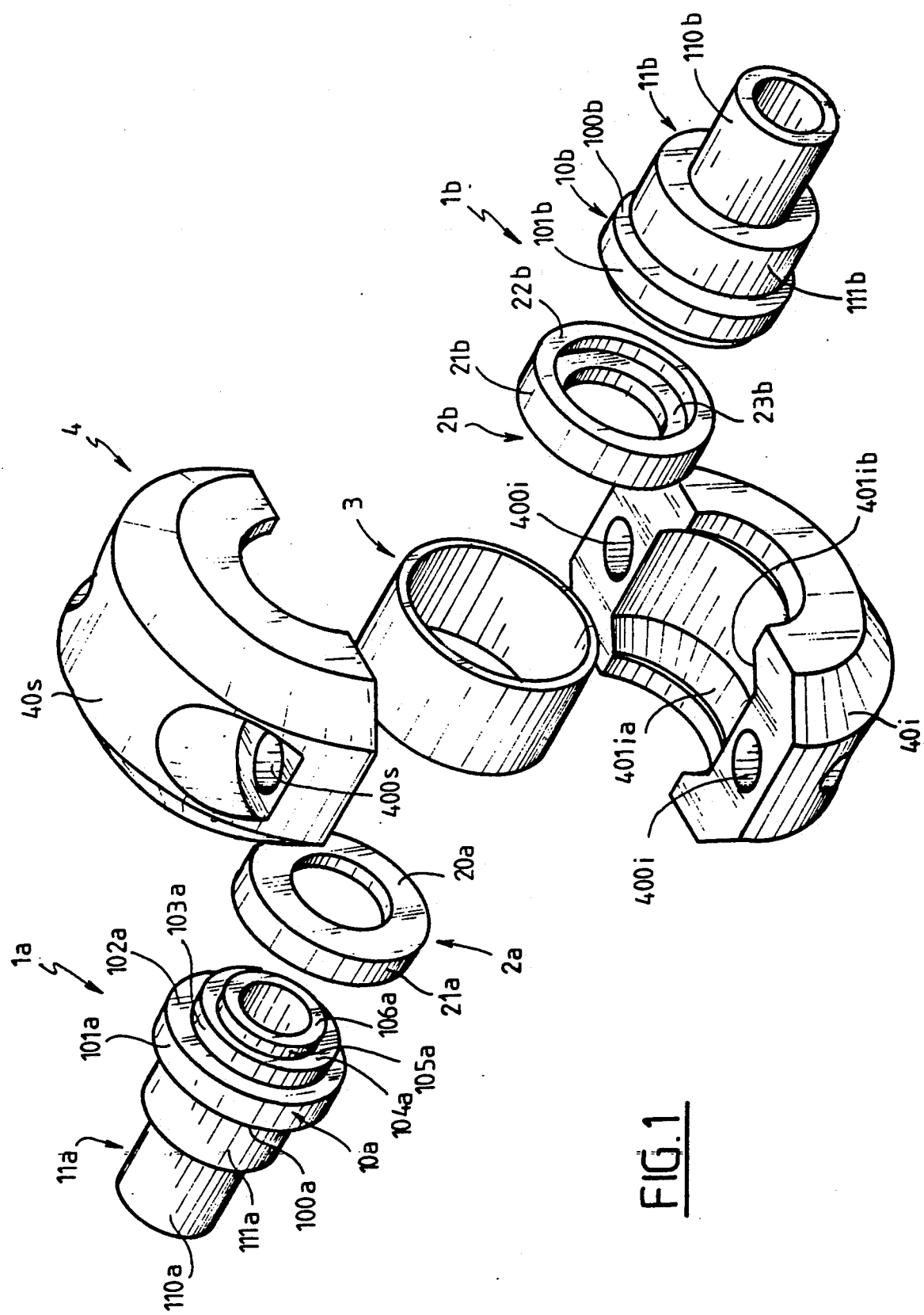
FIG. 1 is a perspective view of a first embodiment of the union in accordance with the invention, in its unassembled state.

As illustrated in FIG. 1, the union comprises two identical coaxial line end fittings 1a, 1b, an elongate metallic ring 3, and two metallic clamping half-shells 4. The elements constituting the end fitting 1a bear the reference numerals followed by the letter a, and those of the end fitting 1b bear the reference numerals followed by the letter b. For reasons of simplification, only the end fitting 1a will be described below; this also applies for the description with reference to FIG. 2.

The end fitting 1a, having a length of a few millimeters to some tens of millimeters, has a fixing end 11a for a fluid line (not shown in these Figures). The term "length" designates here and below, a dimension measured parallel to a longitudinal axis of symmetry. This fixing end 11a here comprises a cylindrical end portion 110a, followed by another cylindrical portion 111a of larger diameter. This end fitting has a central internal bore 12a with a diameter continuous with that of the fluid line when the latter is fixed to the end fitting.

The fixing end 11a is extended in a metallic body 10a which is also coaxial. This body presents externally, starting from the cylindrical portion 111a, a conical bearing surface 100a flaring towards a cylindrical bearing surface 101a having a diameter of approximately 12 mm and a length of approximately 1.8 mm.

This cylindrical bearing surface 101a is followed by a first flat recessed annular radial shoulder 102a connecting it to an intermediate cylindrical bearing surface 103a with a diameter of approximately 9.7 mm and a length of approximately 1.5 mm. This intermediate cylindrical bearing surface 103a is also followed by a second flat recessed annular radial shoulder 104a connecting it to a central cylindrical portion 105a having a diameter of approximately 6.5 mm, and an approximate length of 1 mm. This central cylindrical portion 105a terminates in an annular polished radial section 106a where the internal bore 12a issues.

Another main element of the end fitting consists of a washer 2a made of a deformable synthetic material such as polytetrafluoroethylene marketed under the Trade Mark "TEFLON".

This washer, whose envelope 21a is a cylinder with an outer diameter that is substantially equal to that of the cylindrical bearing surface 101a of the metallic body, has a flat annular rear face 22a abutting against the first flat shoulder 102a of the metallic body. This washer also has a flat annular rear face 23a with a diameter smaller than that of the rear face 22a abutting against the second flat annular shoulder 104a of the metallic body.

The length of the outer lateral face 21a of this washer is approximately 2.54 mm. Thus, when this washer is pressed on the central cylindrical portion 105a and on the intermediate cylindrical bearing surface 103a of the end fitting, the plane of its flat annular radial front face 20a projects by a distance d equal to approximately 5/100th mm from the annular polished section 106a of the end fitting. In other words, this annular polished section 106a is situated to be slightly recessed relative to the annular face 20a of the washer.

The end fitting thus constituted then has a free connecting face constituted by the polished radial section 106a of the metallic body and by the free face 20a of the Teflon (TM) washer 2a.

To proceed with assembly, there is an elongate cylindrical metallic ring 3 having a length of approximately 7 mm, an outer diameter of approximately 12.6 mm and an approximate thickness of 0.3 mm. It should therefore be observed that the inner diameter of this ring is adjusted so as to be substantially equal to that of the outer face 21 of each washer 2, as well as to that of the cylindrical bearing surface 101 of each metallic body.

When the assembly operation is effected, the two end fittings are placed with their free connecting faces opposite each other and the elongate cylindrical ring is slid around them in order to accommodate internally with a contact fit the two Teflon (TM) washers and a portion of each of the cylindrical bearing surfaces 101a, 101b of the metallic bodies.

A first function of this elongate ring 3 is therefore to ensure excellent alignment of the two end fittings so as to ensure as near perfect a centering of their internal bores as possible. When this ring 3 is being positioned, the low coefficient of friction of the Teflon (TM) of the washers in relation to that of the ring 3 allows the ring to slide without any micro-erosion of matter both in the region of the washers 2 and in the region of the ring 3. The expert will therefore note that in general, the first pre-condition to be respected as regards the material constituting the washers 2 is that it must have a low coefficient of friction in relation to that of the material of the ring 3.

Once the two end fittings 1a and 1b are aligned by means of the ring 3, two half-shells 40s and 40i having on their respective inner faces two conical half bearing surfaces 401sa, 401sb and 401ia, 401ib are placed into position round the two end fittings and the ring. These four conical half bearing surfaces then define two conical bearing surfaces 401a and 401b cooperating with the two conical bearing surfaces 100a and 100b of the end fittings. The tightening of the two half-shells is effected by means of two screw bolts (not shown in the Figures) cooperating with holes 400s and 400i arranged in the shells.

During the tightening operation, the cooperation of the conical bearing surfaces of the two half-shells and of the end fittings permits, first of all, an axial compression of the two Teflon (TM) washers 2a, then the contact of the two polished sections 106a and 106b. This is obtained, on the one hand because of the distance d separating the free face of each washer from the polished section 102a of the metallic body, and on the other hand, because of the deformable nature of Teflon (TM). This deformable nature then constitutes a second pre-condition which the material constituting the washers 2a and 2b must in general satisfy. For this purpose, a material will be used which is softer than the stainless steel (316L for example) constituting the union. Apart from polytetrafluoroethylene, suitable materials are its derivatives as for example, an elastomer containing fluorine known under the designation of KEL-F, or other synthetic materials used in the connection technology for gases.

The union thus constituted has a single flat sealing plane constituted by, on the one hand, the interface of the two washers 2 and by, on the other hand, the interface of the two polished sections 106a, 106b. A double seal is thus obtained, on the one hand in the region of the washers and, on the other hand, in the region of the polished sections, and without the interposition of a conventional sealing gasket. Moreover, the geometrical characteristics of the integrally made ring 3, having a chosen length and thickness, make it possible to ensure excellent guidance for the two end fittings all throughout the compression, so as to maintain their alignment.

The fluid tightness of such a union, measured during tests corresponds to less than $10^{-9}$ cm$^3$, s$^{-1}$ leakage of helium for a pressure difference of 1 atmosphere between the internal bore of the union and the outside, for a unit sealing surface of 1 cm$^2$. The union in accordance with the invention thus allows a very good seal to be obtained with a minimum of parts, in particular, without a conventional sealing gasket. Moreover such a union, comprising identical end fittings, requires the manufacture of neither male nor female components; this facilitates its assembly and reduces the cost of mass production.

A union of this type is particularly well suited for the connection of lines for gases, in particular high purity gases such as hydrogen, argon, oxygen, hydrochloric anhydride and other gases suitable for the production of semi-conductors such as phosphoryl chloride (POCl$_3$), boron tribromide (BBr$_3$), trichloroethylene, arsine (AsH$_3$), and silane (SiH$_4$). It may also be used in the connection technology for the manufacture of pharmaceuticals.

Such a union can also withstand high pressures, typically up to several hundreds of bars, and the material constituting the washers 2 is also chosen to resist acid attack.

Figure 4:
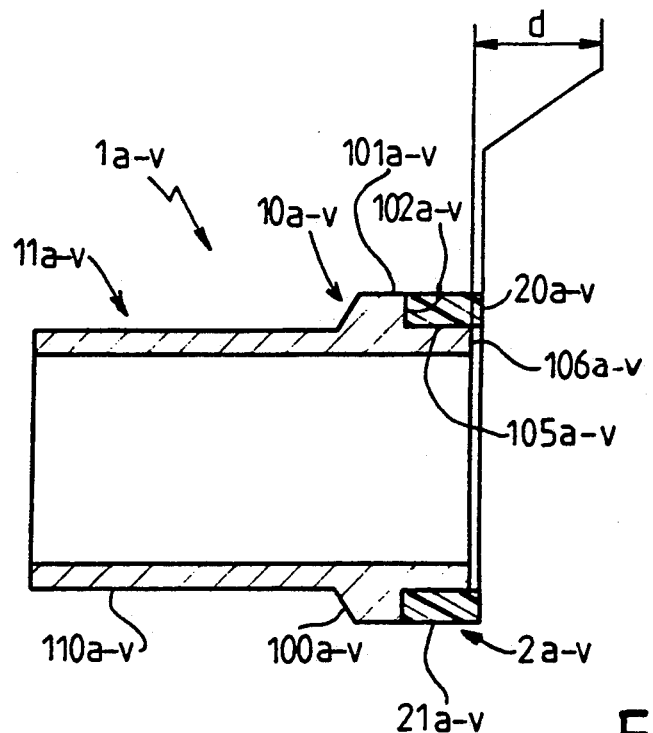
FIG. 4 illustrates, before connection, another embodiment of an end fitting forming part of a union in accordance with the invention.
Figure 5:
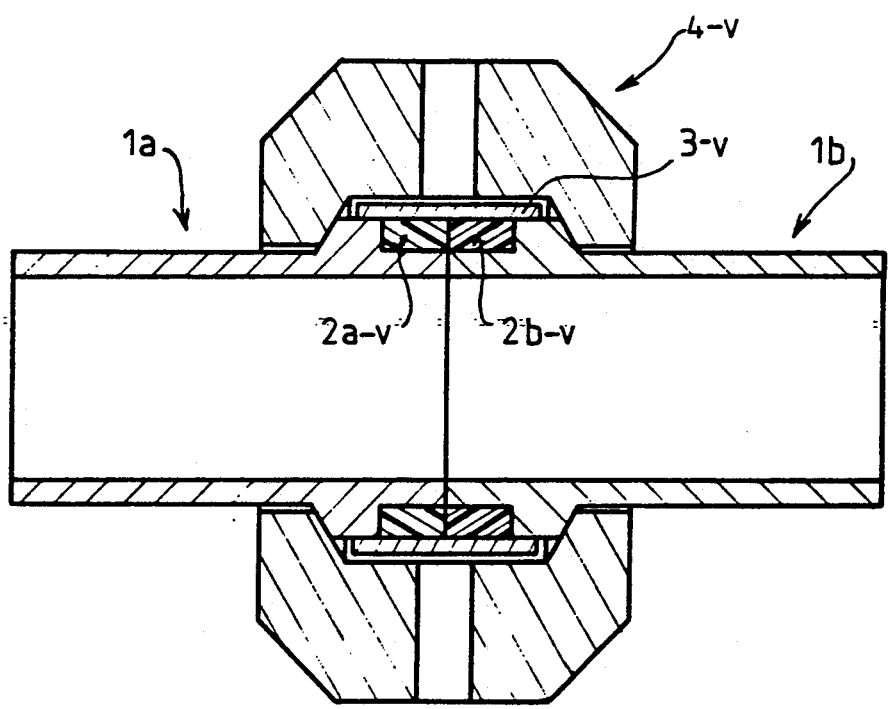
FIG. 5 illustrates this other embodiment of the union, after connection.

FIGS. 4 and 5 illustrate another embodiment of the union in accordance with the invention, which is more particularly adapted to the connection of fluid lines having a diameter of approximately 0.95 cm ($\frac{3}{8}$ th of an inch).

Figure 2:
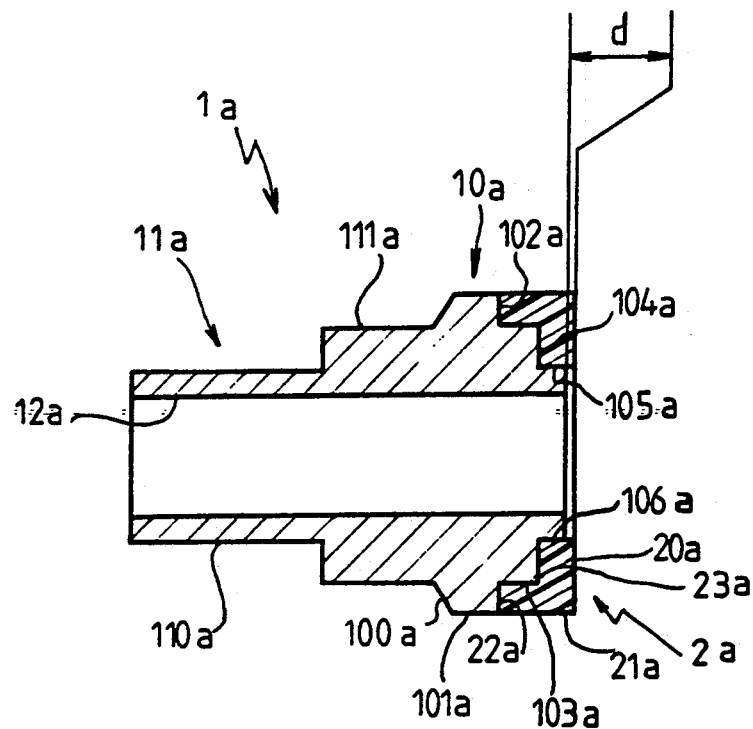
FIG. 2 is a longitudinal section of an end fitting of the union of FIG. 1, before connection.
Figure 3:
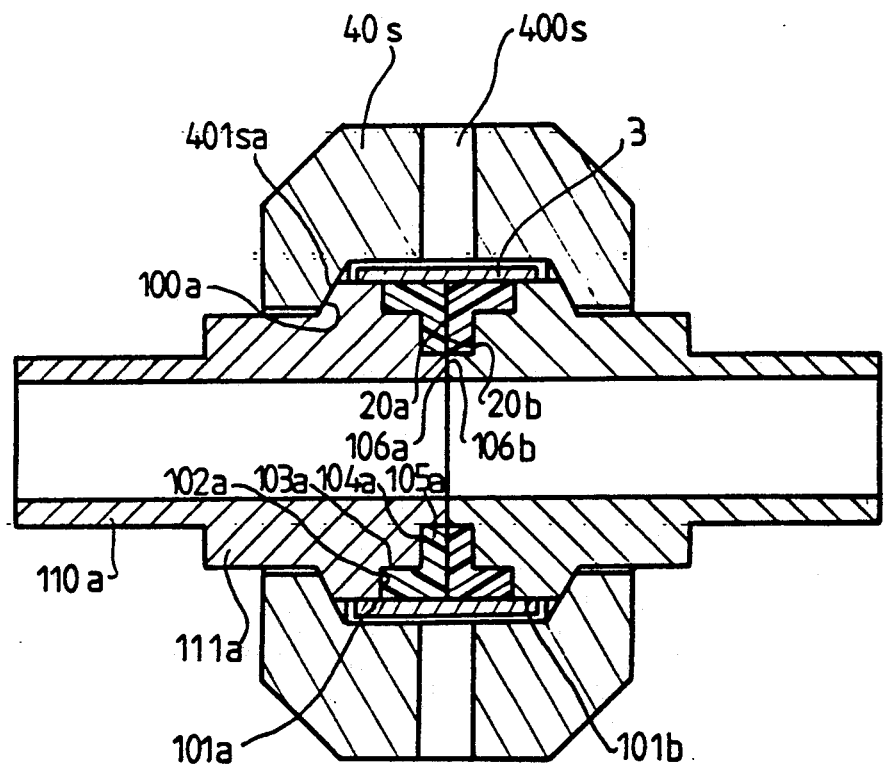
FIG. 3 is a longitudinal section of the union of FIG. 1, after connection.

The elements similar to, or having functions similar to, those shown in FIGS. 1 to 3, have reference numerals followed by the suffix v as compared with those they had in FIGS. 1 to 3. Only the differences between these two embodiments will be described below.

The fixing end 11a-v comprises only the cylindrical end portion 110a-v joined to the conical bearing surfaces 100a-v of the metallic body 10a-v. The cylindrical bearing surface 101a-v of the metallic body is only followed by a single flat shoulder 102a-v recessed towards the central cylindrical portion 105a-v.

The Teflon (TM) washer 2a-v is only constituted by a single cylinder with an external diameter equal to approximately 12 mm and an internal diameter equal to approximately 9.7 mm. It abuts against the annular shoulder 102a-v, and the plane of its annular radial wall 20a-v also projects by 5/100th mm beyond the plane of the annular polished section 106a-v of the metallic body.

The geometrical characteristics of the elongate ring 3-v as well as the tightening means 4-v are adjusted, taking into account the dimensions of this union.

The invention is not limited to the embodiments described above but encompasses all their variants, in particular the following:

two identical end fittings have been described above. It could be envisaged that only their metallic bodies and their deformable synthetic washers should be identical. Indeed, the fixing ends may assume various shapes, kneed or otherwise, so as to be connected to lines of various types, even to several lines at the same time, or even to form part of a hydraulic or pneumatic component such as a valve or filter. The absence of male and female components considerably facilitates the connections.

the number of flat recessed shoulders situated between the cylindrical bearing surfaces of each end fitting and the central cylindrical portion is, of course, not restrictive. Advantageously, reliance on one or two shoulders allows a range of unions to be produced for lines of various diameters, such as from 2 to 6 mm, 6 to 10 mm and 10 to 15 mm, each part of the range using the same general form, that is to say, having a cylindrical bearing surface 101 of the same diameter and similar conical bearing surfaces 100, making it possible to use similar rings and clamping shells for all the ranges.

Of course, some of the means described above may be omitted in variants where they have no useful purpose.

We claim:

1. A union for fluid conduits comprising:
   (A) two end fittings, each having:
      (a) a fixing end intended to join to at least one respective conduit;
      (b) a free connecting face;
      (c) a coaxial metallic body, having an internal bore whose diameter is continuous with that of the conduit to be connected to it and presenting externally thereon, starting from a proximal point at said fixing end, a conical bearing surface flaring outwardly towards a cylindrical bearing surface, said cylindrical bearing surface being followed by at least one flat shoulder radially inwardly recessed towards and connected to a central projecting cylindrical portion, said central projecting cylindrical portion projecting in a direction axially away from said fixing end and terminating in an annular radially inwardly extending polished distal section where said internal bore issues;
      (d) a washer having an external cylindrical shape and made of a deformable synthetic material, said washer being contact-fitted on the central cylindrical portion to abut against said flat shoulder, and having a flat annular radial face which, together with said polished section, forms the free connecting face,
   (B) a metallic elongate cylindrical ring internally accommodating with a contact fit the two washers and a part at least of each of the two cylindrical bearing surfaces of said two end fittings when placed face to face, so that the two free connecting faces come to be opposite each other;
   (C) two half-shells having two conical bearing surfaces similar to the two respective conical bearing surfaces of the two metallic coaxial bodies, and
   (D) means for clamping these two half-shells together to ensure the connection of the fluid conduits.

2. A union according to claim 1, having a fluid tightness corresponding to less than or equal to $10^{-9}$ cm$^3$, s$^{-1}$ leakage of helium for a pressure difference of 1 atmosphere between the inside and outside of the union for a unit sealing surface of 1 cm$^2$.

3. A union according to claim 2, wherein the geometrical characteristics of the end fittings are chosen to allow, during the clamping of the two half-shells, a compression of said two washers followed by contact between said two annular polished sections.

4. A union according to claim 3, wherein before assembly, the plane of said annular radial polished section of each end fitting is slightly recessed in relation to the plane of the flat annular radial face of the corresponding washer.

5. A union according to claim 1, wherein the geometrical characteristics of the end fittings are chosen to allow, during the clamping of the two half-shells, a compression of said two washers followed by contact between said two annular polished sections.

6. A union according to claim 5, wherein before assembly, the plane of said annular radial polished section of each end fitting is slightly recessed in relation to the plane of the flat annular radial face of the corresponding washer.

7. A union according to claim 1, wherein the deformable synthetic material of each washer has a coefficient of friction lower than that of the material of the elongate ring.

8. A union according to claim 1, wherein the synthetic material of each washer is chosen from the group consisting of polytetrafluoroethylene and its derivatives.

9. A union according to claim 1, wherein the cylindrical bearing surface of each end fitting is followed by at least two flat annular shoulders recessed towards said central cylindrical portion.

10. A union according to claim 1, wherein the elongate metallic ring is made integrally, having an internal diameter substantially equal to the external diameter of said washers and to that of the cylindrical bearing surfaces of the two end fittings; and wherein the length and the thickness of this ring are chosen to ensure correct centering of the two end fittings.

11. A union according to claim 1, wherein the fluid to be carried is a gas.

12. A union according to claim 11, wherein the carried gas is a high purity gas.

13. A union according to claim 11, wherein the gas to be carried belongs to the group consisting of hydrogen, argon, oxygen, hydrochloric anhydride, phosphoryl chloride, boron tribromide, trichloroethylene, arsine, and silane.

14. A union according to claim 12, wherein the gas to be carried belongs to the group consisting of hydrogen, argon, oxygen, hydrochloric anhydride, phosphoryl chloride, boron tribromide, trichloroethylene, arsine, and silane.

15. A union according to claim 1, wherein said two end fittings are identical to one another.

16. A union according to claim 1 wherein said flat annular radial face of each of said washers extends radially outward from said polished section of the corresponding end fitting.

* * * * *